(12) United States Patent
Kenneway et al.

(10) Patent No.: US 6,701,001 B1
(45) Date of Patent: Mar. 2, 2004

(54) AUTOMATED PART SORTING SYSTEM

(75) Inventors: Ernest K. Kenneway, Ada, MI (US); Falai Li, Kalamazoo, MI (US); David S. Howes, Battle Creek, MI (US)

(73) Assignee: Dunkley International, Inc., Kalamazoo, MI (US)

( * ) Notice: Subject to any disclaimer, the term of this patent is extended or adjusted under 35 U.S.C. 154(b) by 616 days.

(21) Appl. No.: 09/597,946

(22) Filed: Jun. 20, 2000

(51) Int. Cl.⁷ .............................................. G06K 9/00

(52) U.S. Cl. ....................................................... 382/141

(58) Field of Search ................................. 382/141–150, 382/199, 209, 110; 348/89, 91, 125–130; 209/527, 577, 576, 580, 581, 582; 356/388, 392, 426, 427, 428, 237.1

(56) References Cited

U.S. PATENT DOCUMENTS

| | | | |
|---|---|---|---|
| 4,281,933 A | | 8/1981 | Houston et al. |
| 4,414,566 A | * | 11/1983 | Peyton et al. ............... 382/142 |
| 4,581,762 A | * | 4/1986 | Lapidus et al. |
| 4,696,047 A | * | 9/1987 | Christian et al. ........... 382/146 |
| 4,876,728 A | * | 10/1989 | Roth .......................... 382/153 |
| 5,353,356 A | * | 10/1994 | Waugh et al. ............... 382/143 |
| 5,638,657 A | * | 6/1997 | Archer et al. ................. 53/253 |
| 5,887,073 A | | 3/1999 | Fazzari et al. |
| 5,893,465 A | | 4/1999 | Harangozo |
| 5,917,726 A | * | 6/1999 | Pryor .......................... 700/95 |
| 5,960,098 A | * | 9/1999 | Tao ............................. 382/110 |
| 5,966,457 A | * | 10/1999 | Lemelson ................... 382/141 |
| 5,978,502 A | * | 11/1999 | Ohashi ....................... 382/147 |
| 6,005,959 A | | 12/1999 | Mohan et al. |
| 6,031,931 A | | 2/2000 | Chiu et al. |
| 6,049,379 A | * | 4/2000 | Lucas ...................... 356/240.1 |
| 6,064,759 A | * | 5/2000 | Buckley et al. ............. 382/154 |

OTHER PUBLICATIONS

TVI Products (2 pgs.), http://www.tvivision.com/Products.html, Jun. 2, 2000.
TVI Food Industry (3 pgs.) http://www.tvivision.com/Food_Industry.html, Jun. 2, 2000.
TVI Metal Recycling (1 pg. ) http://www.tvivision.com/Metal_Recycling.html, Jun. 2, 2000.
TVI Mineral Industry (2 pgs.), http://www.tvivision.com/Mineral_Industry.html, Jun. 2, 2000.
TVI Paper Recycling (2 pgs.), http://www.tvivision.com/Paper_Recycling.html, Jun. 2, 2000.
SI Product Concept (2 pgs.), http://www.baslerweb./com/en/products/si/variant.html, Jun. 2, 2000.

(List continued on next page.)

*Primary Examiner*—Jose L. Couso
(74) *Attorney, Agent, or Firm*—Price, Heneveld, Cooper, DeWitt & Litton (57) ABSTRACT

The present invention is directed to a part sorting system for automatically inspecting a plurality of uninspected parts. The system sorts acceptable parts from defective parts and includes a feed conveyor, a sorting camera, at least one rejection valve and a computer system that includes a processor. The feed conveyor receives a plurality of uninspected parts and distributes and moves the uninspected parts through an inspection area. The sorting camera captures an image of each of the plurality of inspected parts as the plurality of uninspected parts moves through the inspection area. The rejection value functions to direct a defective part such that the defective part is separated from inspected acceptable parts. The processor is coupled to the feed conveyor, the sorting camera, and the at least one rejection valve. The processor executing an inspection routine controls the speed of the conveyor, the scanning rate of the sorting camera and the at least one rejection valve. The processor executing the inspection routine compares at least one edge of the captured image to at least one stored template image to determine whether an inspected part is defective.

16 Claims, 4 Drawing Sheets

OTHER PUBLICATIONS

SI Product Concept (2 pgs.), http://www.baslerweb.com/en/products/si/variant1.html, Jun. 2, 2000.

SI Product Concept (2 pgs.), http://www.baslerweb.com/en/products/si/variant2/html, Jun. 2, 2000.

SI Product Concept (2 pgs.), http://www.baslerweb.com/en/products/si/variant3.html, Jun. 2, 2000.

SI Product Concept (2 pgs.), http://www.baslerweb.com/en/products/si/variant4.html, Jun. 2, 2000.

Machine Vision Components (2 pgs.), http://www.baslerweb.com/en/products/mvc/main.html, Jun. 2, 2000.

Product Range (3 pgs.), http://www.baslerweb.com/en/products/mvc/mvc_range.html, Jun. 2, 2000.

Machine Vision Components (2 pgs.), http://www.baslerweb.com/en/products/mvc/prod_range_cmos.html, Jun. 2, 2000.

Technology: Importance (2 pgs.), http://www.baslerweb.com/en/technology/introductions.html, Jun. 2, 2000.

Technology: Examples (3 pgs.), http://www.baslerweb.com/en/technology/examples.html, Jun. 2, 2000.

Technology: How it works (5 pgs.), http://www.baslerweb.com/en/technology/how.html, Jun. 2, 2000.

Technology: Examples (2 pgs.), http://www.baslerweb.com/en/technology/benefits.html, Jun. 2, 2000.

Technology: Examples (2 pgs.), http://www.baslerweb.com/en/technology/importance.html, Jun. 2, 2000.

* cited by examiner

AUTOMATED PART SORTING SYSTEM

BACKGROUND OF THE INVENTION

The present invention is directed to a part sorting system, and more particularly to a part sorting system for automatically inspecting a plurality of uninspected parts.

Machine vision systems have been applied in a variety of applications, which include food processing, metal recycling, mineral processing and paper recycling, among others. As is well known to one of ordinary skill in the art, vision systems are based on non-contact measurements of electromagnetic radiation (e.g., visible light, infrared light and x-rays), which are typically facilitated by a camera. In the manufacturing and processing environments, it is common to optically inspect and sort individual articles with automatic inspection systems. Many of the inspection systems have determined properties (e.g., color, size and shape) of the articles such that defective articles could be separated from good articles.

Machine vision systems have been utilized, for example, to inspect fruit, vegetables and nuts. Machine vision systems have also been utilized in other areas that require a similar sorting of products and/or articles. For example, such systems have been utilized to sort wood chips, aggregates and manufactured products, such as, fasteners and formed parts, in addition to meat products, such as quartered or cubed poultry or beef products.

In a typical system, video images of the products and/or articles are captured, with a camera and a frame grabber, to extract color, shape and/or size related information. Typically, bulk articles are stabilized, using centrifugal force, and conveyed individually past an optical inspection station. In a typical prior art system that implements air deflectors, the center of a defective product is computed such that an air stream is aimed at the center of the product to remove the defective product from a product stream.

Inspection systems have also been designed to inspect various circular parts by dimension and to detect surface defects in the parts. Some of these systems have determined an inside diameter (I.D.), an outside diameter (O.D.) and detected surface defects, such as nicks, fractures, etc. A wide variety of cameras, which include line scan cameras, area scan cameras and CMOS cameras, have been utilized or proposed for utilization in various inspection systems. Images captured by the cameras are automatically processed and evaluated such that image dependent decisions can be implemented. Typically, prior art systems have performed image capturing on a conveyor belt. Unfortunately, such systems must contend with accumulation of trash on the conveyor belt, thus complicating captured image analysis. Most prior art inspection systems have singulated objects for inspection, which has required additional tooling and has added additional costs to the system.

Thus, an inspection system that performs off-belt inspection and does not require article singulation is desirable.

SUMMARY OF THE INVENTION

The present invention is directed to a part sorting system for automatically inspecting a plurality of uninspected parts. The system sorts acceptable parts from defective parts and includes a feed conveyor, a sorting camera, at least one rejection valve and a computer system that includes a processor. The feed conveyor receives a plurality of uninspected parts and distributes and moves the uninspected parts through an inspection area. The sorting camera captures an image of each of the plurality of inspected parts as the plurality of uninspected parts move through the inspection area. The rejection valve functions to redirect a defective part such that the defective part is separated from inspected acceptable parts. The processor is coupled to the feed conveyor, the sorting camera, and the at least one rejection valve. The processor, executing an inspection routine, controls the speed of the conveyor, the scanning rate of the sorting camera and the at least one rejection valve. The processor, executing the inspection routine, also compares at least one edge of a captured image to at least one stored template image to determine whether an inspected part is defective.

In another embodiment of the present invention, a vibratory conveyor distributes the plurality of uninspected parts in a substantially even manner across a top surface of a platform of the vibratory conveyor and provides the plurality of uninspected parts to the feed conveyor. In yet another embodiment, the top surface of the platform is made of a metal that is substantially covered with a material. The material serves to increase the energy absorption and surface friction of the top surface of the platform such that the plurality of uninspected parts are retained on the vibratory conveyor. In still another embodiment of the present invention, the vibratory conveyor includes a plurality of resilient fiberglass legs and an air cylinder. The plurality of resilient fiberglass legs are mechanically coupled to and support a bottom surface of the platform. The air cylinder is mechanically coupled to the bottom surface of the platform and is capable of varying the magnitude and frequency of the vibration of the vibratory conveyor responsive to the processor.

These and other features, advantages and objects of the present invention will be further understood and appreciated by those skilled in the art by reference to the following specification, claims, and appended drawings.

DETAILED DESCRIPTION OF PREFERRED EMBODIMENTS

The present invention is directed to a part sorting system that is capable of sorting objects of various shapes (e.g., round and non-round parts). The part sorting system is capable of separating foreign material, mixed parts, damaged parts and any other nonconforming parts from the product stream. For example, the part sorting system can measure the outside diameter (O.D.) and inside diameter (I.D.) of a round washer (e.g., one-half inch I.D.). In addition, the part sorting system is capable of performing one-hundred percent size inspection at a rate of approximately 1.2 million washers per ten hours (two thousand pieces per minute). The part sorting system uses a template image matching technique to sort defective parts by size and shape. The template image matching technique compares captured part images of a plurality of uninspected parts that may be at random orientations, with at least one trained stored image template of a good part. Out-of-tolerance parts are indicated by size and shape deviation. The present technique is applicable to round and non-round objects of virtually any shape. One of ordinary skill in the art will readily appreciate that the system can be scaled to handle parts of virtually any size.

Preferably, a line scan camera is utilized to capture a one-dimensional array of pixels of multiple sections of each of the plurality of uninspected parts. As is well known to one of ordinary skill in the art, to build an image with a line scan camera, either the camera or the object being inspected must move. An advantage of utilizing a line scan camera is that it advantageously allows for the image capturing of continuously moving objects on a production line. A typical line scan camera has a programmable scan rate, which allows for high precision inspection.

The present invention advantageously performs off-belt inspection such that an object being inspected is backlit. Backlighting the object allows the line scan camera to capture a better image of the part. As such, the resolution (i.e., the number of gray scales that can be determined) is typically increased, which allows fractures in the part to be more readily detected. Further, image capture is enhanced as trash contamination of the captured image, associated with on-belt inspection, is avoided. In a typical system, a hopper provides parts at a controlled rate to a platform of a vibratory conveyor. The vibratory conveyor functions to distribute the parts evenly across a top surface of the platform, so as to typically provide a single layer of single profile parts. Utilizing the system, described herein, is advantageous in that there is no need for special tooling to align the parts in single file. A system, according to the present invention, provides flexibility in that the parts that can be inspected, by the system, can vary in size and shape. Additionally, the automated part sorter, described herein, can advantageously handle parts at random orientations.

The vibratory conveyor provides the plurality of uninspected parts to a feed conveyor that provides part separation and moves the parts through an inspection area, where the line scan camera (or cameras) scan the parts to grab images of the parts. Those part images are analyzed by processor controlled template image matching to sort defective parts by size and shape. The processor makes decision-based inspections and typically saves the inspection data such that it can be further evaluated, when off-line analysis is desired. Acceptable parts continue in the product stream while unacceptable parts are removed from the product stream. In a preferred embodiment, a standard personal computer system, executing a Windows NT® operating system, is utilized. The system is expandable in that other cameras (e.g., line scan, area scan or CMOS) and vision processing boards can be added to the system, to increase the resolution and through-put of the part sorting system, if desired. Preferably, the system includes a modem, which enables remote access for technical training, trouble shooting and upgrading of the part sorting system.

Figure 1:
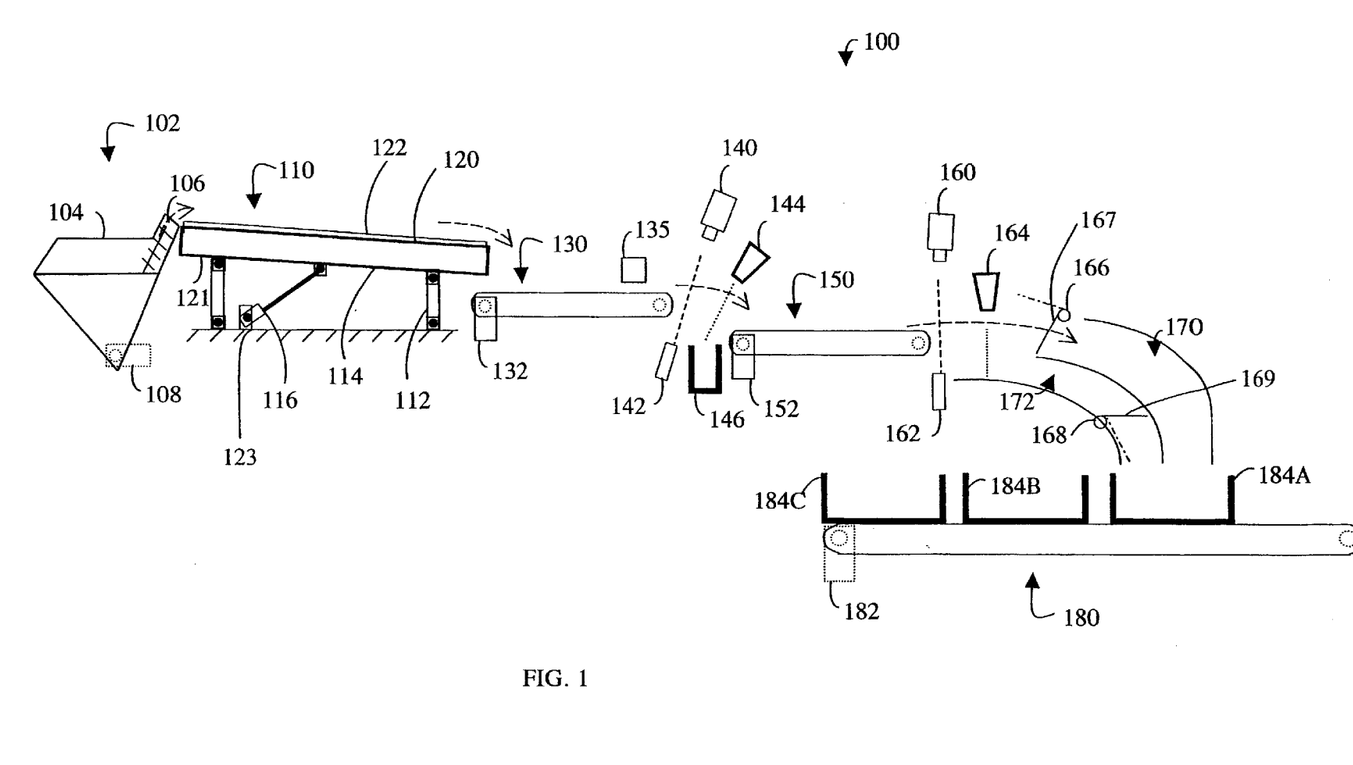
FIG. 1 is a simplified diagram of a part sorting system, according to an embodiment of the present invention.

Turning to FIG. 1, a part sorting system 100, according to an embodiment of the present invention, is shown. Initially, uninspected parts are supplied to the part sorting system 100 by loading the parts into a bin 104 of a hopper 102. The parts are supplied to a vibratory conveyor 110 via a hopper conveyor 106, which is driven by a hopper motor 108 that is under processor 202 (FIG. 2) control. Vibratory conveyor 110 includes a platform 121 that has a top surface 120 and a bottom surface 114. In a preferred embodiment, the top surface 120 of vibratory conveyor 110 includes a material 122. The material 122 serves to increase the energy absorption and surface friction of the top surface 120 of the vibratory conveyor 110. A suitable material 120 is manufactured and made commercially available by Great Lakes Belting (Part No. FNV100TG). The thickness of material 120 (preferably made of nitrile) is part dependent.

Attached to the bottom surface 114, of platform 121, is one end of each of a plurality of legs (e.g., fiberglass) 112 that support platform 121 and are mechanically coupled to the bottom surface 114, of platform 121. An opposite end of the plurality of legs 112 is coupled to a support structure 123. One end of an air cylinder 116 is mechanically coupled to the bottom surface 114 of platform 121. An opposite end of the air cylinder 116 is coupled to the support structure 123.

A suitable air cylinder 116 is manufactured and made commercially available by Martin Engineering (Part No. 32505). Air cylinder 116, under processor 202 control, varies the magnitude and frequency of the vibration of the vibratory conveyor 110 such that the parts are normally separated into a single layer. The vibration of the vibratory conveyor 110 causes the parts to move across the top surface 120 of the platform 121 in the direction of feed conveyor 130. Processor 202, of system 100, optimally controls the vibration of vibratory conveyor 122 such that parts of different size and weight can be sorted with part sorting system 100. Commercially available vibratory conveyors have not allowed the frequency and amplitude of the vibration to be part optimized and thus, cannot be utilized for a wide variety of parts.

Feed conveyor 130 includes a feed conveyor motor 132 for driving a conveyor belt (not shown), of feed conveyor 130. Feed conveyor motor 132 includes an encoder (not shown) that provides signals to processor 202 such that processor 202 can determine the speed of the belt and, in turn, the speed of the parts across the feed conveyor 130. Feed conveyor 130 delivers the plurality of uninspected parts to an inspection area defined by camera 140 and rejection valve 144. As conveyor 130 moves the plurality of uninspected parts into the inspection area, camera 140, under processor 202 control, captures images of the individual uninspected parts. The capturing of images is facilitated by a backlight 142. The illumination provided by backlight 142 can be derived, for example, from a light emitting diode (LED) or a fluorescent light source. The backlight 142 allows camera 140 to capture images with sharper contrast, which enables systems 100 to detect, for example, fractures in the face of a part.

Preferably, an air stream is provided across backlight 142 such that backlight 142 remains free of various trash (e.g., dirt, oil, etc.) that typically comes off the conveyor belt. Preferably, a clean-in-place (CIP) air knife is applied to the belt of feed conveyor 132 such that trash is removed. As previously stated, aligning parts on a track or on multiple tracks limits the ability of a given part sorting system to handle a wide variety of parts. In a preferred embodiment, backlight 142 includes a plurality of optical fibers that provide backlighting, of the uninspected parts, for camera 140. A suitable camera is manufactured and made commercially available by Basler (Part No. L1GD). A suitable backlight is manufactured and made commercially available by Illumination Technology (Part No. 3900).

Upon capturing an image of each part, the image is analyzed by processor 202. Processor 202 executes image processing software which compares the captured image to at least one template image to determine whether a part is defective. As will be further described below, when a defective part is detected, processor 202 causes one or more air valves located within rejection valve 144 to be actuated. Utilizing multiple air valves within rejection valve 144 allows multiple parts that are side-by-side to be inspected at the same time and allows a good part that is adjacent to a defective part to remain in the product stream when a defective part is removed from the product stream. A suitable rejection valve is manufactured and made commercially available by MAC (Part No. 52).

Preferably, a processing thread of the inspection software causes system 100 to continuously grab and process images of parts, while system 100 is active. This is facilitated through the use of multiple buffers, which allow processing of one image while live grabbing of a second image. The software calculates the time at which a given defective part can be acted upon by an appropriate air valve, within rejection valve 144, and activates the appropriate air valve or valves at that time. One of ordinary skill in the art will appreciate that, the time is dependent upon the speed of the belt of the feed conveyor 130 and the positioning of the rejection valve 144 with respect to the inspection end of feed conveyor 130. One of ordinary skill in the art will also appreciate that the appropriate air valve, of rejection valve 144, is typically determined by the location of the part on the conveyor belt. Actuating an appropriate air valve, of rejection valve 144, causes the defective part to be deflected into a reject chute 146. Good parts pass from feed conveyor 130 to take-away conveyor 150 undisturbed by rejection valve 144.

Take-away conveyor 150 provides inspected good parts through a part counting area, defined by part counting camera 160. A part counting backlight 162 provides backlight illumination to the parts for easier detection by part counting camera 160. Part counting camera 160 is also coupled to processor 202 such that processor 202 can determine when a packaging box 184A, 184B or 184C, located on packaging box conveyor 180, contains a desired number of parts. At that point, processor 202 causes a top gate actuator 166 and a bottom gate 168 to move a top gate 167 and a bottom gate 169 to a closed position.

Under processor 202 control, packaging valve 164 deflects the good parts into a bottom chute 172. Processor 202 then actuates a packaging box conveyor motor 182 such that a new empty packaging box 184B is delivered beneath bottom chute 172 and top chute 170 such that it can receive good parts. Upon positioning a new box 184B to receive parts from the bottom chute 172 and the top chute 170, processor 202 opens top gate 166 and bottom gate 172 such that the held good parts are delivered into the packaging box 184B. In this manner, good parts are retained in bottom chute 172 while the new packaging box 184B is moved into position. This process is repeated when the new packaging box 184B receives the desired number of parts. Thus, a part sorting system has been described, which allows a wide variety of parts to be automatically inspected, sorted and packaged.

Figure 2:
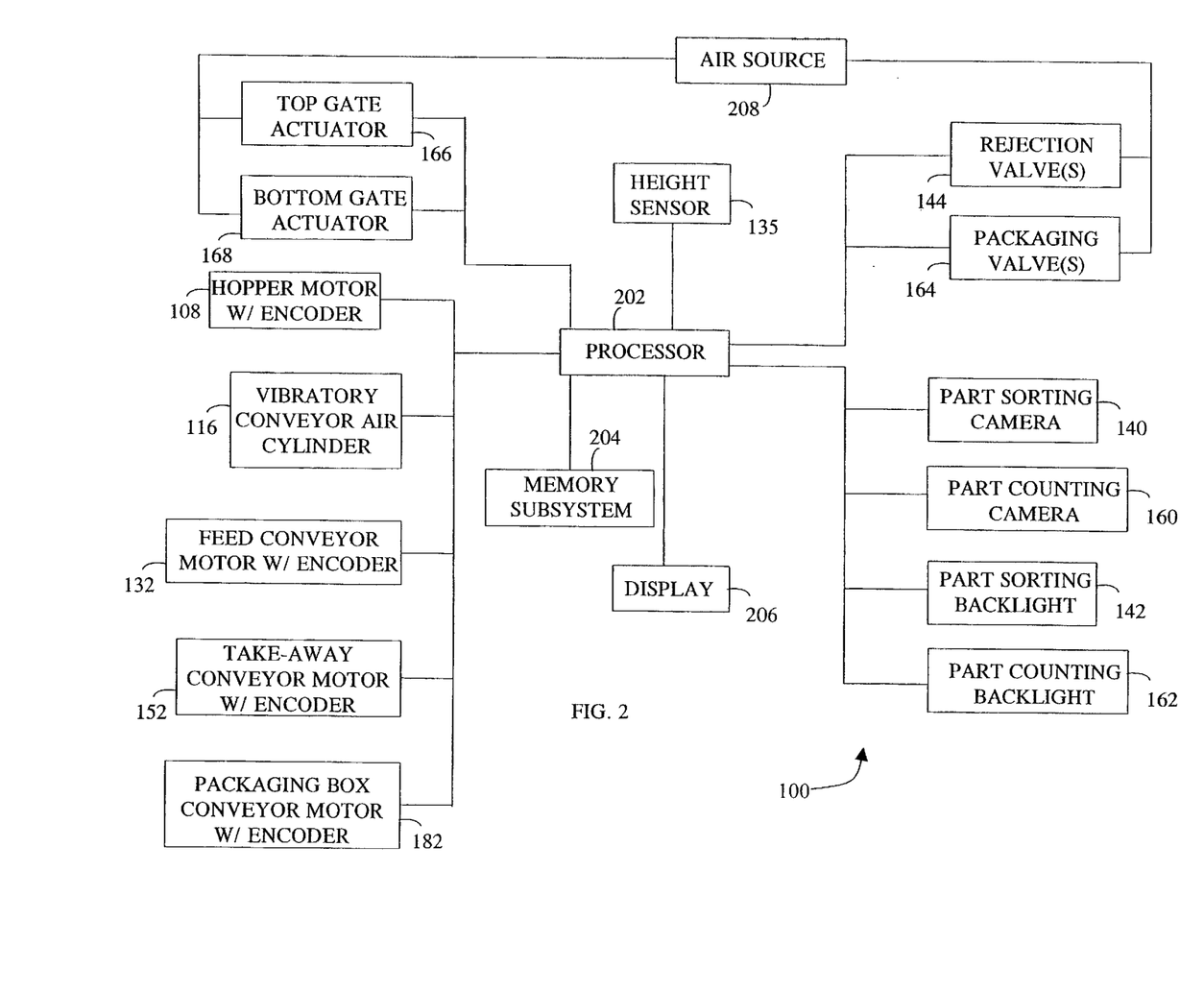
FIG. 2 is a block diagram of the major components of the part sorting system of FIG. 1.

FIG. 2 illustrates a block diagram of most of the major electrical/electro-mechanical components of the part sorting system 100 of FIG. 1. As previously discussed, processor 202 is coupled to a top gate actuator 166 and a bottom actuator 168 such that it controls the opening and closing of the top gate 167 and bottom gate 169. Processor 202 is also coupled to a hopper motor 108, a vibratory conveyor air cylinder 116, a feed conveyor motor 132, a take-away conveyor motor 152 and a packaging box conveyor 182. Processor 202 provides control signals to motors 108, 132, 152 and 192 and receives signals from encoders located within motors 108, 132, 152 and 192 that allow processor 202 to determine if the motors 108, 132, 152 and 182 have responded appropriately. For example, processor 202 receives signals from the encoder of feed conveyor motor 132, which allow processor 202 to synchronize the operation of the part sorting camera 140 with the speed of the feed conveyor motor 132.

Processor 202 is also coupled to and controls rejection valve 144 and packaging valve 164. An air source 208 provides pressurized air to the top gate actuator 166, bottom gate actuator 168, rejection valve 144 and the packaging valve 164. Processor 202 is also coupled to a display 206, which is preferably a touch screen display, and to a memory subsystem 204. Memory subsystem 204 includes an application appropriate amount of volatile and non-volatile memory. Processor 202 is coupled to part sorting backlight 142 and part counting backlight 162 and desirably controls the illumination provided by the backlights 142 and 162 so as to optimize the image capturing of part sorting camera 140 and part counting camera 160.

Processor 202 is also coupled to a height sensor 135, which provides a rough indication of the height of a given individual part. Height sensor 135 allows system 100 to determine when multiple parts are stuck together and is preferably a laser through beam sensor manufactured and made commercially available by SUNX (Part No. LAS11). One of ordinary skill in the art will appreciate that an overhead image of two parts that are stuck together may not cause the parts to be rejected, as a defective part, without a rough height indicator. Thus, by making a rough height determination, such an anomaly can be detected. One of ordinary skill in the art will also appreciate that, if desired, another camera (e.g., line scan) can be positioned and coupled to processor 202 to determine the height of the parts more precisely.

Figure 3:
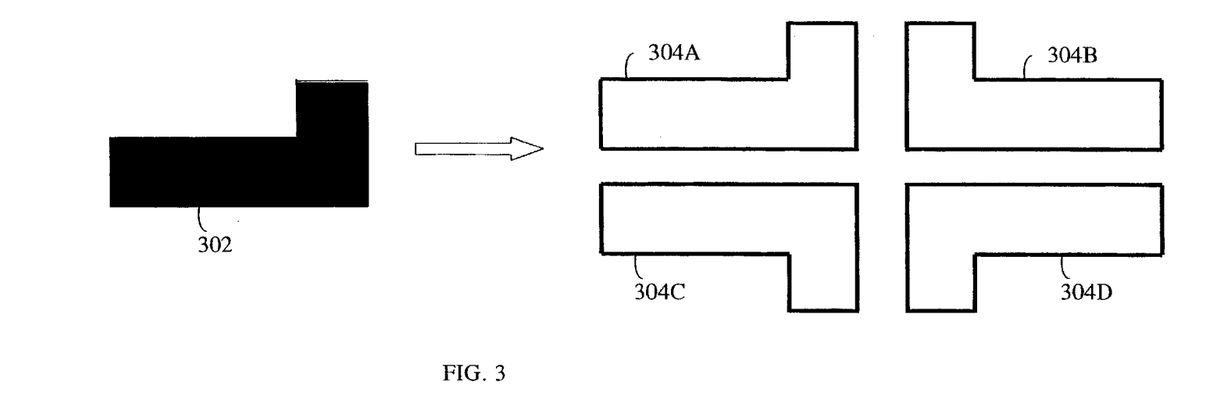
FIG. 3 illustrates a part training routine, according to an embodiment of the present invention.

FIG. 3 illustrates a part training routine that allows system 100 to develop template images of good parts. A number of good parts 302 (e.g., four to six parts) are run through the part sorting system 100 such that templates 304A, 304B, 304C and 304D are generated. Depending on the shape of the part, one, two, or four templates may be required. For example, a round part only requires one template since it is symmetrical. As shown in FIG. 3, four templates 304A, 304B, 304C and 304D are required for part 302. One of ordinary skill in the art will appreciate that the number of templates required is dependent upon how the software orients a given part. The software utilized by system 100 preferably rotates a captured part image to zero degrees and then utilizes the pixels on the edge of the part to determine whether the part is defective.

Figure 4:
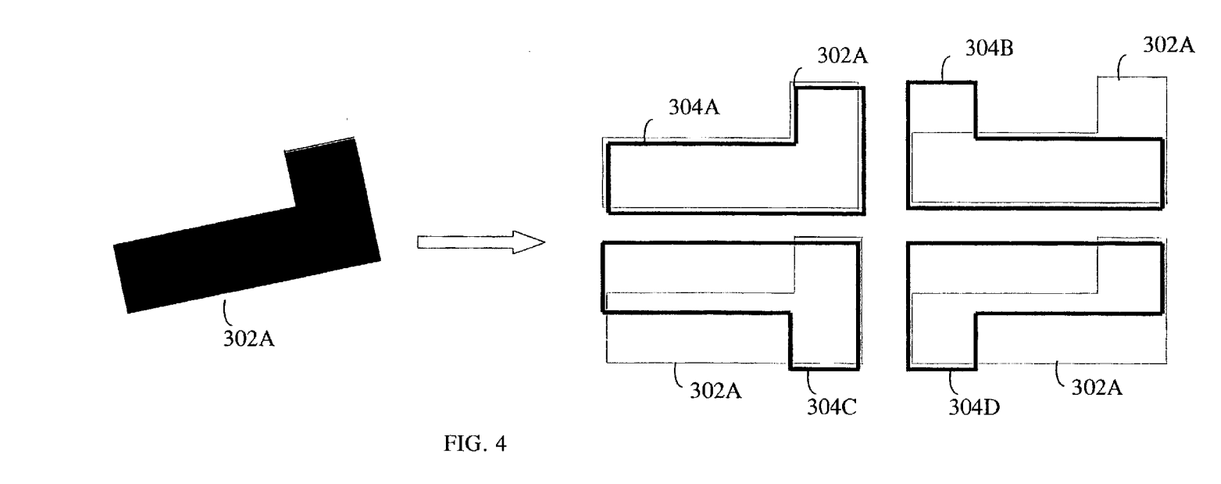
FIG. 4 is a diagram illustrating the capturing and comparison of an image of a part at a non-zero degree orientation whose edge pixels are compared to the templates of FIG. 3.

As illustrated in FIG. 4, an image of a part 302A, at a non-zero degree orientation, is captured. To facilitate comparison, the edge pixels of part 302A are rotated to a zero degree orientation and compared with each of the templates 304A, 304B, 304C and 304D, as required. As shown in FIG. 4, the edge pixels of image 302A match template 304A. In determining whether a given part is defective, the image of the part is compared to one or more of the templates and the number of the pixels outside each template are counted. If a given part matches at least one template within defined limits, it is a good part. Otherwise, if a given part does not match any template within the defined limits, it is a defective part. It is advantageous to only compare the edge pixels in that the amount of time required for processing the edge pixels is typically appreciably lower (part dependent) than that of processing all part pixels.

Figure 5:
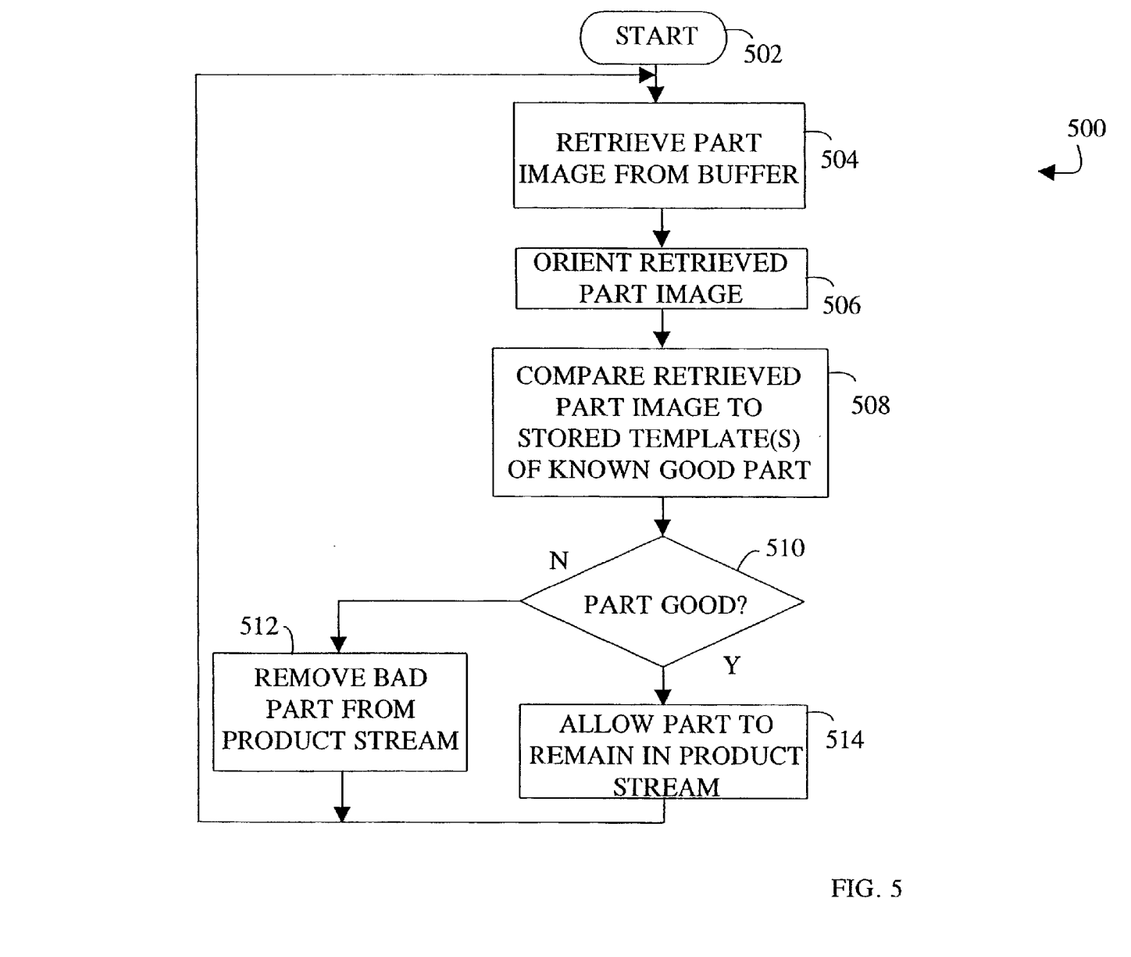
FIG. 5 is a flowchart of an image processing routine that determines whether a given part is defective.

FIG. 5 shows a flowchart of an image processing routine 500, executed by processor 202, that determines whether a given part is defective. In step 502, routine 500 is initiated. Next, in step 504, a part image that has been buffered is retrieved from a memory buffer. Then, in step 506, the part image is oriented. Next, in step 508, the retrieved part image is compared to at least one stored template of a Known good part. Then, in decision step 510, processor 202 determines whether the part is good. If so, control transfers to step 514. Otherwise, control transfers to step 512. In step 514, processor 202 allows the part to remain in the product stream and control returns to step 504. In step 512, processor 202 causes the defective part to be removed from the product stream at which point control transfers to step 504. As mentioned above, processor 202 causes a defective part to be removed from the product stream by actuating an appropriate portion of rejection valve 144 at an appropriate time.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A part sorting system for automatically inspecting a plurality of uninspected parts, the system sorting acceptable parts from defective parts, the system comprising:

a feed conveyer for receiving a plurality of uninspected parts, the feed conveyor distributing and moving the uninspected parts through an inspection area;

a sorting camera for capturing an image of each of the plurality of uninspected parts as the plurality of uninspected parts move through the inspection area;

at least one rejection valve, the rejection valve functioning to direct a defective part such that the defective part is separated from inspected acceptable parts;

a computer system, including:
     a processor coupled to the feed conveyer, the sorting camera and the at least one rejection valve, wherein the processor executes an inspection routine that controls the speed of the feed conveyer, the scanning rate of the sorting camera and the at least one rejection valve, and wherein the processor executing the inspection routine compares at least one edge of the captured image to at least one stored template image to determine whether an uninspected part is defective; and a vibratory conveyor including a platform having a top surface and a bottom surface, the vibratory conveyor distributing the plurality of uninspected parts in a substantially even manner across the top surface of the platform and providing the plurality of uninspected parts to the feed conveyer.

2. The system of claim 1, wherein the top surface of the platform is made of a metal that is substantially covered with a material, the material serving to increase the energy absorption and surface friction of the top surface of the platform.

3. The system of claim 2, wherein the vibratory conveyor further includes:

a plurality of resilient fiberglass legs mechanically coupled to and supporting the bottom surface of the platform; and an air cylinder mechanically coupled to the bottom surface of the platform, the air cylinder varying the magnitude and frequency of the vibration of the platform in response to the processor.

4. The system of claim 1, further including:

a height sensor coupled to the processor and positioned adjacent the inspection area, the height sensor providing an indication of the height of each of the plurality of uninspected parts to the processor.

5. The system of claim 1, further including:

a light source for backlighting the plurality of uninspected parts as the plurality of uninspected parts move through the inspection area, the backlighting enhancing the ability of the sorting camera to capture gray scale images of each of the plurality of uninspected parts.

6. The system of claim 5, wherein the light source is provided via a plurality of optical fibers.

7. The system of claim 1, further including:

a hopper for receiving the plurality of uninspected parts, the hopper providing the uninspected parts to the vibratory conveyor responsive to the processor.

8. The system of claim 1, wherein the sorting camera is a line scan charge coupled device (CCD) camera.

9. The system of claim 1, wherein the sorting camera is a line scan complementary metal-oxide semiconductor (CMOS) camera.

10. The system of claim 1, further including:

an electric motor coupled to the processor, the electric motor driving the feed conveyer responsive to the processor; and an encoder coupled to the processor, the encoder providing an indication of the speed of the motor and hence the associated speed of the. feed conveyor, wherein the processor sets a scan rate for the sorting camera responsive to the speed of the feed conveyor.

11. A method for automatically inspecting a plurality of uninspected parts and sorting acceptable parts from defective parts, the method comprising the steps of:

receiving a plurality of uninspected parts;

distributing and moving the uninspected parts through an inspection area;

capturing an image of each of the plurality of uninspected parts as the plurality of uninspected parts move through the inspection area;

comparing at least one edge of the captured image of each of the plurality of uninspected parts to at least one stored template image to determine whether an uninspected part is defective; and directing a defective part such that the defective part is separated from inspected acceptable parts, wherein the plurality of uninspected parts are distributed in a substantially even manner across a top surface of a platform of a vibratory conveyor which provides the plurality of uninspected parts to a feed conveyer.

12. The method of claim 11, wherein the top surface of the platform is made of a metal that is substantially covered with a material, the material serving to increase the energy absorption and surface friction of the top surface of the platform.

13. The method of claim 12, wherein the vibratory conveyor further includes a plurality of resilient fiberglass legs mechanically coupled to and supporting a bottom surface of the platform and an air cylinder mechanically coupled to the bottom surface of the platform, the air cylinder varying the magnitude and frequency of the vibration of the vibratory conveyor in response to the processor.

14. The method of claim 11, further including the step of:

determining the height of each of the plurality of uninspected parts.

15. The method of claim 11, further including the step of:

backlighting the plurality of uninspected parts as the plurality of uninspected parts move through the inspection area, the backlighting enhancing the ability of a sorting camera to capture gray scale images of each of the plurality of uninspected parts.

16. The method of claim 11, further including:

setting a scan rate for a sorting camera responsive to the speed of a feed conveyor, wherein the sorting camera captures an image of each of the plurality of uninspected parts and the feed conveyor distributes and moves the uninspected parts through an inspection area.

* * * * *

UNITED STATES PATENT AND TRADEMARK OFFICE
CERTIFICATE OF CORRECTION

PATENT NO. : 6,701,001 B1
DATED : March 2, 2004
INVENTOR(S) : Ernest K. Kenneway and David S. Howes It is certified that error appears in the above-identified patent and that said Letters Patent is hereby corrected as shown below:

Column 5,
Line 15, delete "5";

Column 7,
Line 10, "Known" should be -- known --; and

Column 8,
Line 37, before "feed" delete ".".

Signed and Sealed this

Twenty-ninth Day of June, 2004

JON W. DUDAS
*Acting Director of the United States Patent and Trademark Office*